United States Patent
Perone et al.

(10) Patent No.: US 11,797,459 B2
(45) Date of Patent: Oct. 24, 2023

(54) SHARED MACHINE-LEARNING DATA STRUCTURE

(71) Applicant: Hewlett-Packard Development Company, L.P., Houston, TX (US)

(72) Inventors: Christian Perone, Porto Alegre (BR); Carlos Haas, Palo Alto, CA (US); Roberto Pereira Silveira, Porto Alegre (BR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1132 days.

(21) Appl. No.: 16/096,446

(22) PCT Filed: Jun. 17, 2016

(86) PCT No.: PCT/US2016/038128
§ 371 (c)(1),
(2) Date: Oct. 25, 2018

(87) PCT Pub. No.: WO2017/218009
PCT Pub. Date: Dec. 21, 2017

(65) Prior Publication Data
US 2019/0130300 A1    May 2, 2019

(51) Int. Cl.
*G06N 20/00* (2019.01)
*G06F 13/16* (2006.01)
(Continued)

(52) U.S. Cl.
CPC ............ *G06F 13/1663* (2013.01); *G06F 9/46* (2013.01); *G06F 9/4843* (2013.01);
(Continued)

(58) Field of Classification Search
CPC ... G06F 13/1663; G06F 9/4843; G06N 20/00; G06T 1/20
See application file for complete search history.

(56) References Cited

U.S. PATENT DOCUMENTS 5,829,013 A * 10/1998 Hasbun ............... G06F 12/0292
711/E12.083
8,364,613 B1   1/2013 Lin
(Continued)

FOREIGN PATENT DOCUMENTS

CN        1627251 A    6/2005
CN       105227669     1/2006
(Continued)

OTHER PUBLICATIONS

Brodtkorb, André R. et al. "Graphics processing unit (GPU) programming strategies and trends in GPU computing." Journal of Parallel and Distributed Computing 73, No. 1 (2013): 4-13.
(Continued)

*Primary Examiner* — Hang Pan
(74) *Attorney, Agent, or Firm* — Knobbe, Martens, Olson & Bear, LLP

(57) ABSTRACT

Examples include a system comprising a non-volatile memory to store a machine-learning data structure. Examples access the machine-learning data structure with a first processing resource, and examples access the machine-learning data structure with a second processing resource, which includes at least one graphics processing core, such that the machine-learning data structure is a shared memory space of the first processing resource and the second processing resource.

15 Claims, 8 Drawing Sheets

(51) Int. Cl.
  *G06F 9/46* (2006.01)
  *G06T 1/60* (2006.01)
  *G06T 1/20* (2006.01)
  *G06F 12/084* (2016.01)
  *G06F 9/48* (2006.01)

(52) U.S. Cl.
  CPC ............ *G06F 12/084* (2013.01); *G06F 13/16* (2013.01); *G06N 20/00* (2019.01); *G06T 1/20* (2013.01); *G06T 1/60* (2013.01)

(56) References Cited

U.S. PATENT DOCUMENTS

| | | | |
|---|---|---|---|
| 8,762,298 | B1 | 6/2014 | Ranjan |
| 2005/0125369 | A1 | 6/2005 | Buck et al. |
| 2008/0193010 | A1* | 8/2008 | Eaton .............. G06V 20/52 382/159 |
| 2009/0016600 | A1 | 1/2009 | Eaton |
| 2011/0157195 | A1* | 6/2011 | Sprangle .......... G06F 9/3877 345/522 |
| 2012/0154373 | A1 | 6/2012 | Finocchio et al. |
| 2014/0006686 | A1* | 1/2014 | Chen ............. G06F 12/1433 711/102 |
| 2014/0198116 | A1 | 7/2014 | Veal et al. |
| 2015/0379424 | A1* | 12/2015 | Dirac .............. G06N 20/00 706/12 |
| 2016/0019469 | A1 | 1/2016 | Petrov |
| 2016/0019805 | A1 | 1/2016 | Allen |
| 2016/0019806 | A1 | 1/2016 | Best et al. |
| 2016/0217387 | A1* | 7/2016 | Okanohara ....... G06N 20/00 |
| 2017/0220949 | A1* | 8/2017 | Feng ............... H04L 41/16 |
| 2020/0090073 | A1* | 3/2020 | Zhan ............... G06N 20/00 |

FOREIGN PATENT DOCUMENTS

| | | |
|---|---|---|
| CN | 102004671 A | 4/2011 |
| JP | 2005182785 | 7/2005 |
| JP | 2007299250 | 11/2007 |
| JP | 2010050970 | 3/2010 |
| JP | 2012118441 | 6/2012 |
| JP | 2012516645 | 7/2012 |
| JP | 2013513873 | 4/2013 |
| JP | 2015076094 | 4/2015 |
| JP | 2015148917 | 8/2015 |
| JP | 2015148917 B2 | 8/2015 |
| JP | 2015526806 | 9/2015 |
| WO | WO-2015192806 | 12/2015 |
| WO | WO-2015192812 | 12/2015 |
| WO | WO-2016094635 | 6/2016 |

OTHER PUBLICATIONS

Che, Shuai et al. "A performance study of general-purpose applications on graphics processors using CUDA." Journal of parallel and distributed computing 68, No. 10 (2008): 1370-1380.

Nickolls, John et al. "The GPU computing era." IEEE micro 30, No. 2 (2010): 56-69.

Scherer, Dominik, et al. "Accelerating large-scale convolutional neural networks with parallel graphics multiprocessors." In International conference on Artificial neural networks, pp. 82-91. Springer, Berlin, Heidelberg, 2010.

Science@NASA, "Universe Older Than Previously Thought", Mar. 21, 2013; Retrieved from Internet: https://science.nasa.gov/science-news/science-at-nasa/2013/21mar_cmb. 9 pages.

Simard, Patrice, et al. "Tangent prop-a formalism for specifying selected invariances in an adaptive network." In Advances in neural information processing systems, pp. 895-903. 1992.

Tan, K-L et al. "In-memory databases: Challenges and opportunities from software and hardware perspectives." ACM SIGMOD Record 44, No. 2 (2015): 35-40. < http://dl.acm.org/citation.cfm?id=2814717 >.

Tveit, Amund. "Example of Sharing Memory Between GPU and CPU with Swift and Metal for iOS8." Memkite, published online http://memkite.com/blog/2014/12/30/example-of-sharing-memory-between-gpu-and-cpu-with-swift-and-metal-for-ios8 (2015).

Yang, Yi, et al. "CPU-assisted GPGPU on fused CPU-GPU architectures." In IEEE International Symposium on High-Performance Comp Architecture, pp. 1-12. IEEE, 2012.

Vetter, Jeffrey S. et al.: "Opportunities for nonvolatile memory systems in extreme-scale high-performance computing." Computing in Science & Engineering 17, No. 2 (2015): 73-82.

Zou, Qiaosha et al.: "Heterogeneous architecture design with emerging 3D and non-volatile memory technologies", The 20th Asia/South Pacific Design Automation Conference, IEEE, Jan. 19, 2015, pp. 785-790.

Tveit, Amund. "Example of Sharing Memory Between GPU and CPU with Swift and Metal for iOS8." Memkite, published online http://memkite Available online at: com/blog/2014/12/30/example-of-sharing-memory-between-gpu-and-cpu-with-swift-and-metal-for-ios8 (2015).

Nesreen et al., "An Empirical Comparison of Machine Learning Models for Time Series Forecasting", Econometric Reviews, vol. 29, No. 5-6, Aug. 30, 2010, pp. 594-621.

Jing, Y., et al., "LOM-Based Community P2P Learning Resource Sharing Model", Journal of East China Normal University (Natural Science), Jan. 2006, vol. 1, pp. 101-107. (English Abstract submitted).

Wenfang, C., et al., "System Design and Implementation of a Resource-Sharing Platform for Polar Samples", Jun. 2013, vol. 25, No. 2, 13 pages. (English Abstract submitted ).

* cited by examiner

SHARED MACHINE-LEARNING DATA STRUCTURE

BACKGROUND

Some data processing systems may perform machine-learning on datasets to generate results. Examples of machine learning may comprise classification, regression, clustering, density estimation, dimensionality reduction, and/or other such types of analysis. In such examples, data processing systems may analyze a dataset based on machine-learning models.

DRAWINGS

Figure 1A:
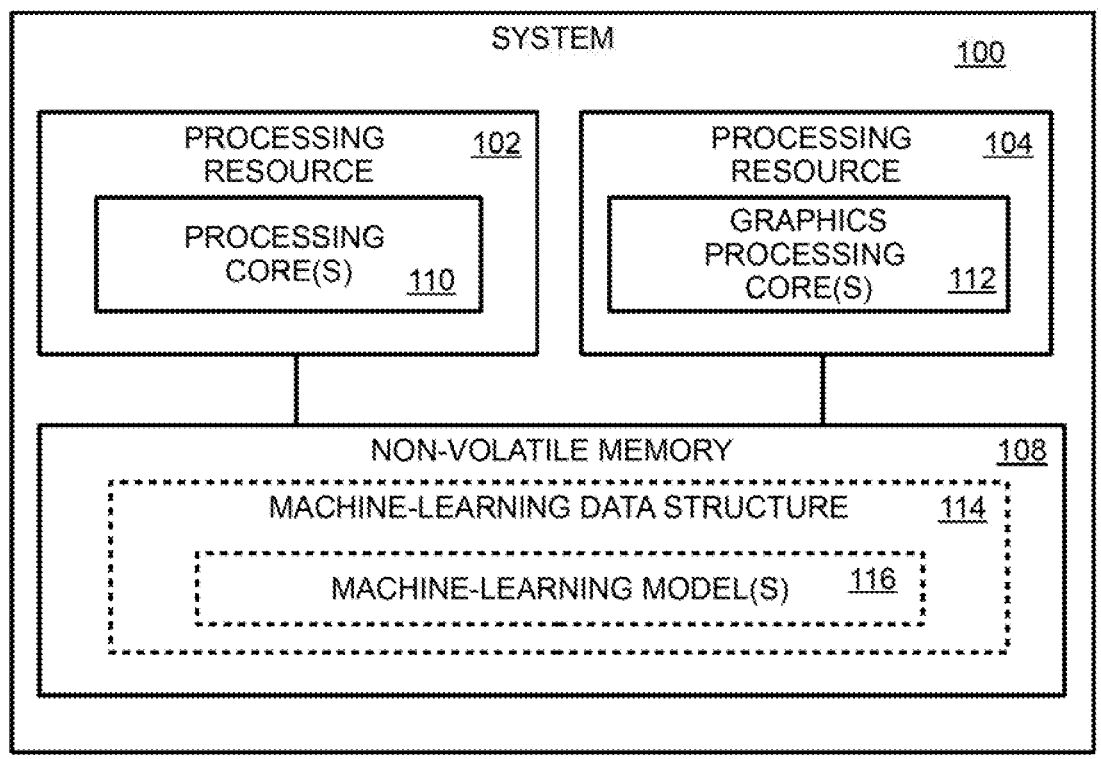
FIG. 1A is a block diagram of some components an example system that may make use of the disclosure.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Example data processing systems may comprise a non-volatile memory to store a machine-learning data structure. The machine-learning data structure may correspond to a shared memory space of a first processing resource and a second processing resource, where the second processing resource may include at least one graphics processing core. In some examples, the non-volatile memory may have access speeds such that the first processing resource and the second processing resource may processing instructions and data directly in the machine-learning memory structure. A data processing system, as used herein, may include, for example, a personal computer, a portable computing device (e.g., laptop, tablet computer, smartphone), a server, blades of a server, a processing node of a server, a system-on-a-chip (SOC) computing device, a processing node of a SOC device, and/or other such data processing devices/systems. As used herein, a data processing system may be referred to as a computing system or simply a system.

Examples herein may facilitate improved processing efficiency, reduced resource utilization, and/or increased computational complexity for data processing systems in which machine-learning may be performed. Examples described herein may comprise a non-volatile memory resource to store a machine-learning data structure. The machine-learning data structure may include at least one machine-learning model. A machine-learning model may comprise a plurality of operations to be performed on a dataset based at least in part upon model parameters of the machine-learning model to generate model results for the dataset.

Examples of machine-learning models may comprise regression based models, instance based models, regularization based models, decision tree based models, Bayesian network based models, clustering based models, association rule learning models, artificial neural network based models, dimensionality reduction based models, ensemble based models, and/or other such types of machine-learning models. As will be appreciated, in some examples, a machine-learning data structure may store a plurality of types of machine-learning models. As discussed, each machine-learning model may comprise a set of model parameters. Some examples may tune model parameters by performing operations of the machine-learning model on a learning dataset and updating the model parameters based on model results generated from the learning dataset.

Examples of non-volatile memory (NVM) may comprise may comprise read-only memory (ROM) (e.g., Mask ROM, PROM, EPROM, EEPROM, etc.), flash memory, solid-state memory, non-volatile state RAM (nvSRAM), battery-backed static RAM, ferroelectric RAM (FRAM), magnetoresistive RAM (MRAM), phase-change memory (PCM), magnetic tape, optical drive, hard disk drive, 3D cross-point memory (3D XPoint), programmable metallization cell (PCM) memory, silicon-oxide-nitride-oxide-silicon (SONOS) memory, resistive RAM (RRAM), domain-wall memory (DWM), nano-RAM, floating junction gate RAM (FJG RAM), memristor memory, spin-transfer torque RAM (STT-RAM), as well as other memory devices/modules that maintains stored information across power cycles (e.g., off/on). Non-volatile memory that stores data across a power cycle may also be referred to as a persistent data memory. As used herein, a non-volatile memory resource may comprise one device and/or module or a combination devices and/or modules.

In some examples, the non-volatile memory resource may correspond to a class of non-volatile memory which is referred to as storage class memory (SCM). In these examples, the SCM non-volatile memory is byte-addressable, synchronous with a processing resource, and in a processing resource coherent domain. Moreover, SCM non-volatile memory may comprise types of memory having relatively higher read/write speeds as compared to other types of non-volatile memory, such as hard-drives or magnetic tape memory devices. Examples of SCM non-volatile memory include some types of flash memory, RRAM, memristors, PCM, MRAM, STT-RAM, as well as other types of higher read/write speed persistent data memory devices. As will be appreciated, due to relatively low read and write speeds of some types of non-volatile memory, such as spin-disk hard drives, NAND flash, magnetic tape drives, processing resources may not directly process instructions and data with these types of non-volatile memory. However, a processing resource may process instructions and data directly with a SCM non-volatile memory.

In addition, examples may comprise processing resources coupled to the non-volatile memory resource. In particular, an example system may comprise a first processing resource coupled to the non-volatile memory to access the machine-learning data structure, and the example system may comprise a second processing resource coupled to the non-volatile memory to access the machine-learning data structure. Accordingly, the machine-learning data structure of the non-volatile memory resource is a shared memory space of the first processing resource and the second processing resource. In some examples described herein, a shared memory space indicates that the first processing resource and the second processing resource may directly read/write data to and from the machine-learning data structure. Furthermore, it will be appreciated that for a shared memory space the first processing resource and the second processing resource may access (e.g., read/write data to/from) the machine-learning data structure concurrently.

In example data processing systems, the first processing resource may comprise a plurality of processing resources, and, similarly, the second processing resource may comprise a plurality of processing resources. In some examples, the first processing resource may correspond to a general purpose data processor, such as a central processing unit (CPU) that includes at least one processing core. In some examples, the first processing resource may comprise an application-specific integrated circuit (ASIC), and/or other such configurations of logical components for data processing. In some examples, the first processing resource may comprise a plurality of processing cores that may process/execute instructions in parallel, synchronously, concurrently, in an interleaved manner, and/or in other such instruction execution arrangements. In some examples, each processing core may execute more than one instruction thread (which is often referred to as a multi-threaded core).

The second processing resource may comprise at least one graphics processing core, which may be referred to as a dedicated graphics processing core. In some examples, the second processing resource may correspond to a graphics processing unit (GPU). In such examples, a graphics processing core may comprise specialized circuitry and logic to process image/video and/or digital signal based data. In some examples, the second processing unit may comprise a plurality of graphics processing cores that may process large blocks of data in parallel. In some examples, the second processing unit may perform stream and/or vector processing with specialized graphics processing cores. As will be appreciated, in some examples, the second processing unit and the at least one graphics processing core thereof may be used to execute various types of operations that may not correspond to a graphics based operation (which is often referred to as general-purpose computing on GPUs). In some examples, operations of at least one machine-learning model stored in the machine-learning data structure of the non-volatile memory may be performed on a dataset using the at least one graphics processing core of the second processing resource.

Figure 1B:
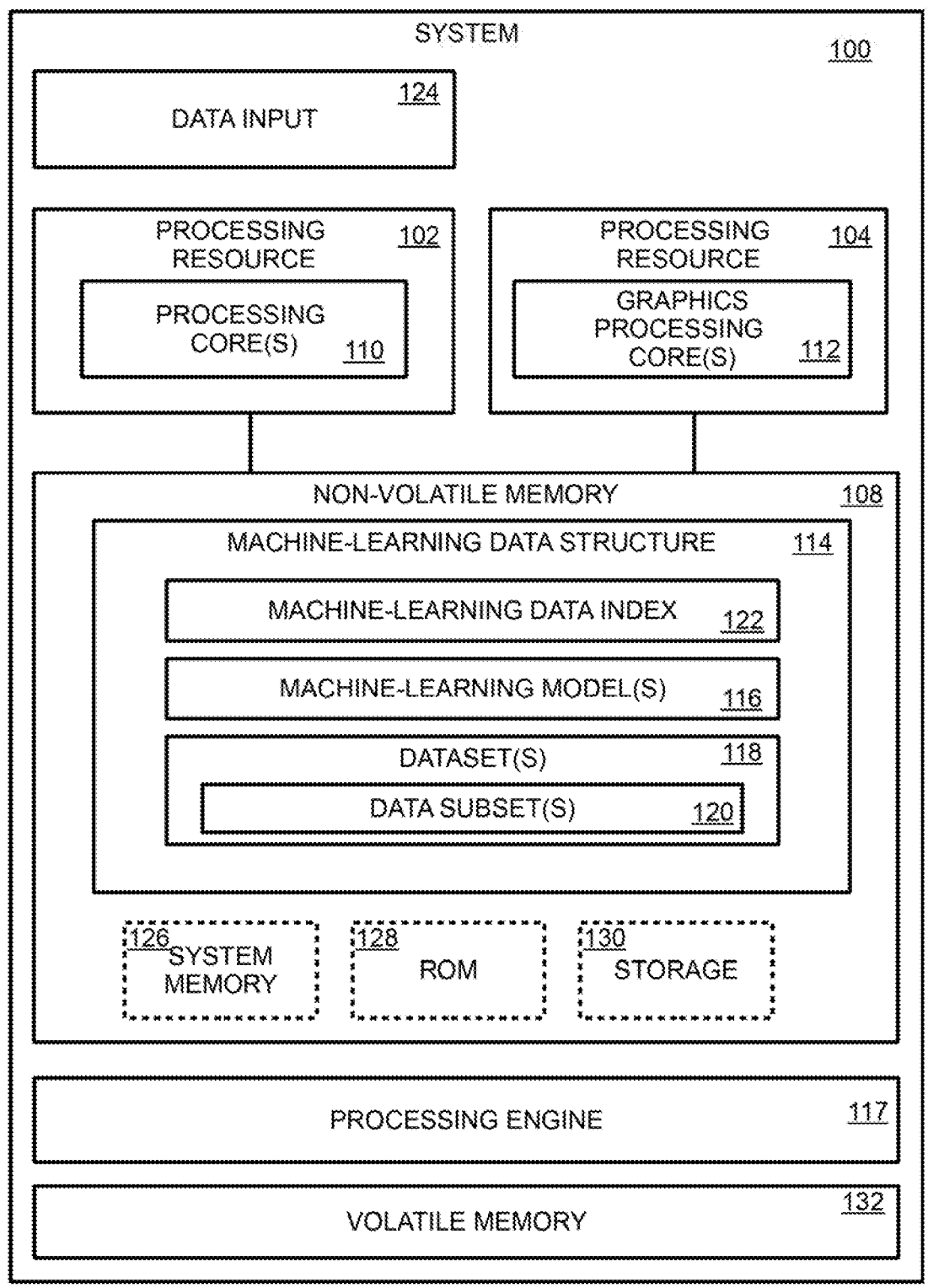
FIG. 1B is a block diagram of some components an example system that may make use of the disclosure.

Turning now to the figures, and particularly to FIGS. 1A-B, these figures provide block diagrams that illustrate examples of a system 100. Examples of a system as disclosed herein include a personal computer, a portable electronic device (e.g., a smart phone, a tablet, a laptop, a wearable device, etc.), a workstation, a smart device, server, a processing node of a server, a data center comprising a plurality of servers, and/or any other such data processing devices. In the examples of FIGS. 1A and B, the system 100 comprises a first processing resource 102, a second processing resource 104, and a non-volatile memory 108 coupled to the processing resources 102, 104.

As shown, the first processing resource 102 comprises at least one processing core 110, and the second processing resource 104 comprises at least one graphics processing core 112. The non-volatile memory 108 is to store a machine-learning data structure 114 that may include at least one machine-learning model 116. In the examples described herein, a first processing resource 102 may include at least one hardware-based processor. Furthermore, the processing resource 102 may include one processor or multiple processors, where the processors may be configured in a single system 100 or distributed across multiple systems connected locally and/or remotely.

As discussed previously, the second processing resource 104 may comprise at least one graphics processing core 112. In some examples, the second processing resource 104 may comprise a multi-core graphics processing unit (GPU). In some examples, the graphics processing cores may include an execution pipeline and a graphics processing core to perform floating point operations (often referred to as a floating point unit).

As further shown in the example provided in FIG. 1B, the system 100 may further comprise a processing engine 117. In such examples, the processing engine 117 may coordinate execution of the at least one learning model 116 with the first processing resource 102. Concurrent with such coordination, the processing engine 117 may execute, with the at least one graphics processing core 112 of the second processing resource 104 operations of the at least one machine learning model 116. Accordingly, it will be appreciated, that the first processing resource 102 may coordinate instruction issuing associated with the machine learning model 116 for execution by the graphics processing core 112 of the second processing resource 104. In some examples coordinating execution of the at least one machine learning model 116 with the first processing resource may comprise causing switching of execution of at least two machine learning models 116 in the at least one graphics processing core 112 of the second processing resource 104.

In the example system of FIG. 1B, the machine-learning data structure 114 may further include at least one dataset 118, where the at least one dataset 118 may comprise at least one data subset 120. As will be appreciated, a dataset generally refers to a collection of related information, and a data subset generally refers to a separate element of such dataset. A dataset may correspond to various types of data or combinations of types of data.

For example, a dataset may comprise video data captured with a video camera peripheral and stored in the machine-learning data structure 114. In this example, a data subset of such video data may comprise a time slice of such video data, where a time slice may be an increment of time duration of the video data. For example, a data subset for video data may be a time slice having a duration of 10 seconds, 1 second, 500 milliseconds (ms), 10 ms, 1 ms, etc. In another example, a dataset may correspond to multimedia data, such as a combination of video and audio data. In this example, a data subset may correspond to a time slice such multimedia data. In other examples, a dataset may correspond to various environmental measurements over time (e.g., temperature, pressure, etc.) detected with various types of sensors (e.g., temperature sensors, pressure sensors, etc.). In other examples, a data set may correspond to measurements of various types of electromagnetic radiation over time detected with various types of sensors (e.g., light sensors, radio wave sensors, ultraviolet sensors, etc.). As will be appreciated, a dataset may correspond to various other types of data collected with various other types of sensors and/or devices.

In addition, the non-volatile memory 108 may include a machine-learning data index 122 that may be used to point to various types of data stored in the machine-learning data structure 114 such that the first processing resource 102 and/or the second processing resource 104 may coordinate reading and/or writing of data in the machine-learning data structure 114. In this example, the machine-learning data index 122 is illustrated as being stored within the machine-learning data structure 114; however, in other examples, the machine-learning data index 122 may be stored in other locations of the non-volatile memory 108. As will be appreciated, in some examples, the machine-learning data index 122 may be a persistent structure index and/or a persistent object index. In some examples, it will be appreciated a virtual addressing scheme may be implemented for the processing resources 102, 104 and the non-volatile memory 108. In such examples, the machine-learning data index 122 may facilitate virtual address translation for physical memory addresses of the non-volatile memory 108.

In FIG. 1B, the example system 100 comprises a data input 124 with which data may be received from peripheral devices, such as sensors, image/video capture devices, audio capture devices, and/or other such peripheral input devices. In some examples, the data input 124 may facilitate capture and storage of a real-time data stream. In these examples, the real-time data stream may be stored as a dataset 118 in the machine-learning data structure 114 by the first processing resource 102. Concurrent with storing of such real-time data stream with the first processing resource 102, the second processing resource 104 may execute operations of the at least one machine-learning model 116 on data subsets 120 of the dataset 118 of real-time data with the at least one graphics processing core 112. Therefore some examples may facilitate real-time processing of a real-time data stream with at least one machine-learning model. As will be appreciated, real-time machine-learning processing may facilitate various types of data processing operations. For example, a machine-learning model may correspond to object recognition, and a video data stream may be analyzed with the object recognition machine-learning model.

As illustrated in FIG. 1B, the non-volatile memory 108 may further include a system memory 126, a read-only memory (ROM) 128, and/or storage 130 stored thereon. As will be appreciated, these additional allocations of memory 126-130 in the non-volatile memory 108 may be accessible (i.e., shared) by the first processing resource 102 and the second processing resource 104. However, in some examples, the additional allocations of memory 126-130 may not be shared between the first processing resource 102 and the second processing resource 104. For example, the system memory 126 may only be accessible by the first processing resource 102. As will be appreciated, other example allocations of the non-volatile memory 108 may be implemented in other examples.

Furthermore, the system 100 may comprise a volatile memory 132. As will be appreciated, the volatile memory 132 may comprise random access memory (RAM) or other such memory that does not persist data across a power cycle. While the example of FIG. 1B illustrates the system memory 126, ROM 128, and storage 130 as stored in the non-volatile memory 108, it will be appreciated that in other examples, such data may be stored in the volatile memory 132. In some examples, the volatile memory may include a shared memory portion accessible by the first processing resource 102 and the second processing resource 104. In some examples, the non-volatile memory 108 and/or volatile memory 132 may include memory portions that are not shared by the first processing resource 102 and the second processing resource 104.

While not shown in FIGS. 1A-B, for interface with a user or operator, some example systems may include a user interface incorporating one or more user input/output devices, e.g., one or more buttons, a display, a touchscreen, a speaker, etc. The user interface may therefore communicate data to the processing resource and receive data from the processing resource. For example, a user may input one or more selections via the user interface, and the processing resource may cause data to be output on a screen or other output device of the user interface. Furthermore, the system may comprise a network interface device. As will be appreciated, the network interface device comprises one or more hardware devices to communicate data over one or more communication networks, such as a network interface card.

Furthermore, example systems, such as the example system of FIGS. 1A-B, may comprise engines, where such engines (such as the processing engine 117) may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to process and execute those instructions.

In some examples, a system implementing such engines may include the machine-readable storage medium storing the instructions and the processing resource to process the instructions, or the machine-readable storage medium may be separately stored and accessible by the system and the processing resource. In some examples, engines may be implemented in circuitry. Moreover, processing resources used to implement engines may comprise at least one central processing unit (CPU), a graphics processing unit (GPU), an application specific integrated circuit (ASIC), a specialized controller (e.g., a memory controller) and/or other such types of logical components that may be implemented for data processing.

Figure 2:
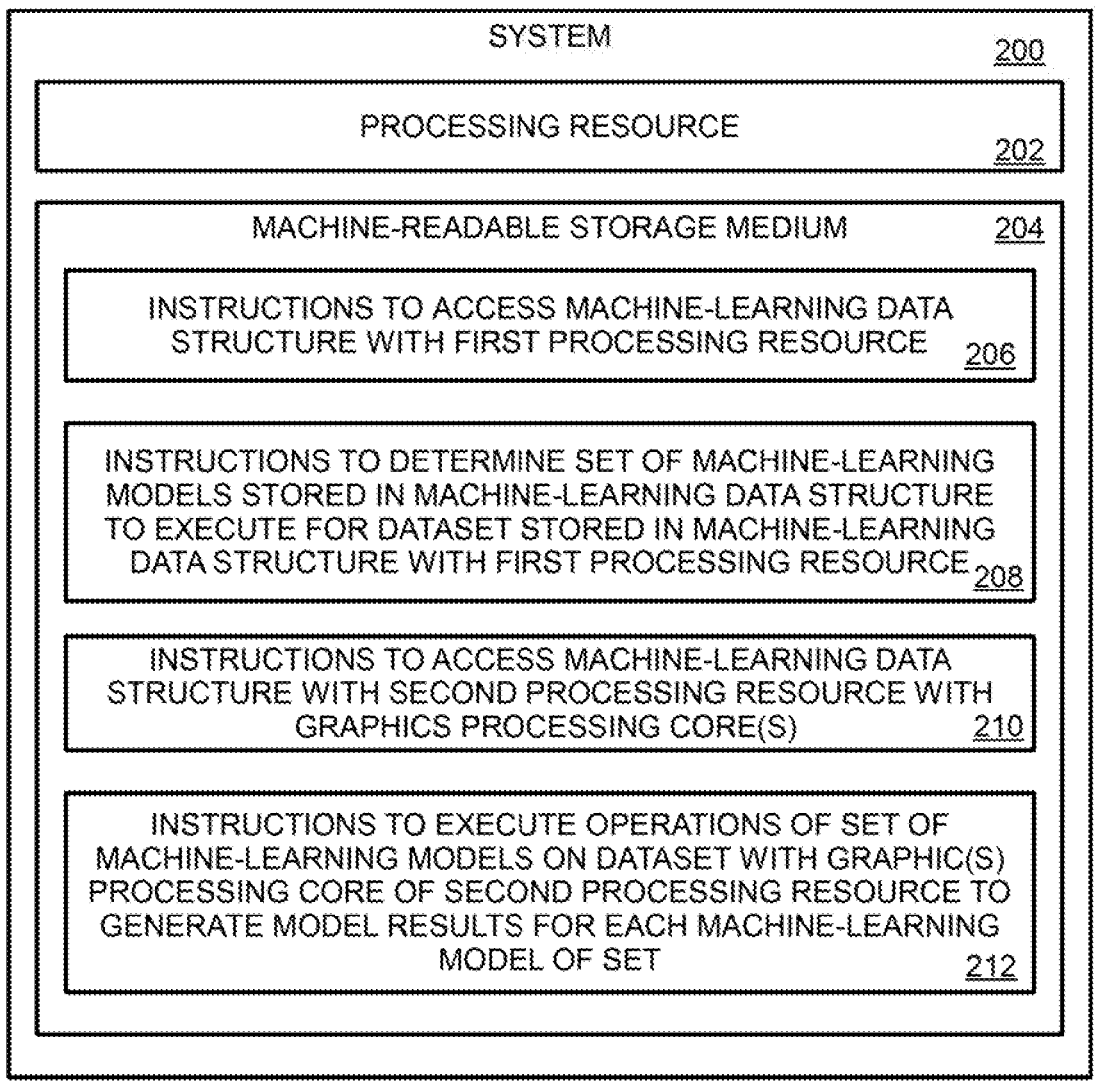
FIG. 2 is a block diagram of some components an example system that may make use of the disclosure.

FIG. 2 provides a block diagram that illustrates an example system 200. In this example, the system 200 comprises at least one processing resource 202 and a machine readable storage medium 204. The machine-readable storage medium 204 may represent the random access memory (RAM) devices comprising the main storage of the example system 100, as well as any supplemental levels of memory, e.g., cache memories, non-volatile or backup memories (e.g., programmable or flash memories), read-only memories, etc. In addition, machine-readable storage medium 204 may be considered to include memory storage physically located elsewhere, e.g., any cache memory in a microprocessor, as well as any storage capacity used as a virtual memory, e.g., as stored on a mass storage device or on another system in communication with the example system 200. Furthermore, the machine-readable storage medium 204 may be non-transitory. In some examples, the processing resource 202 and machine-readable storage medium 204 may correspond to processing units and memory devices arranged in at least one server. In other examples, the processing resource 202 and machine-readable storage medium may be arranged in a system-on-a-chip device.

In addition, the machine-readable storage medium 204 may be encoded with and/or store instructions that may be executable by the processing resource 202, where execution of such instructions may cause the processing resource 202 and/or system 200 to perform the functionalities, processes, and/or sequences of operations described herein. In the example of FIG. 2, the machine-readable storage medium 204 comprises instructions to access a machine-learning data structure with a first processing resource 206. In addition, the machine-readable storage medium 204 comprises instructions to determine a set of machine-learning models stored in the machine learning data structure to execute for a dataset stored in the machine learning data structure with the first processing resource 208. Furthermore, the machine-readable storage medium 204 comprises instructions to access the machine-learning data structure with a second processing resource that includes at least one graphics processing core 210. The machine-readable storage medium 204 also comprises instructions to execute operations of the set of machine learning models on a dataset stored in the machine learning data structure with the at least one graphics processing core of the second processing resource to generate respective model results for each respective machine learning model of the set.

Figure 3:
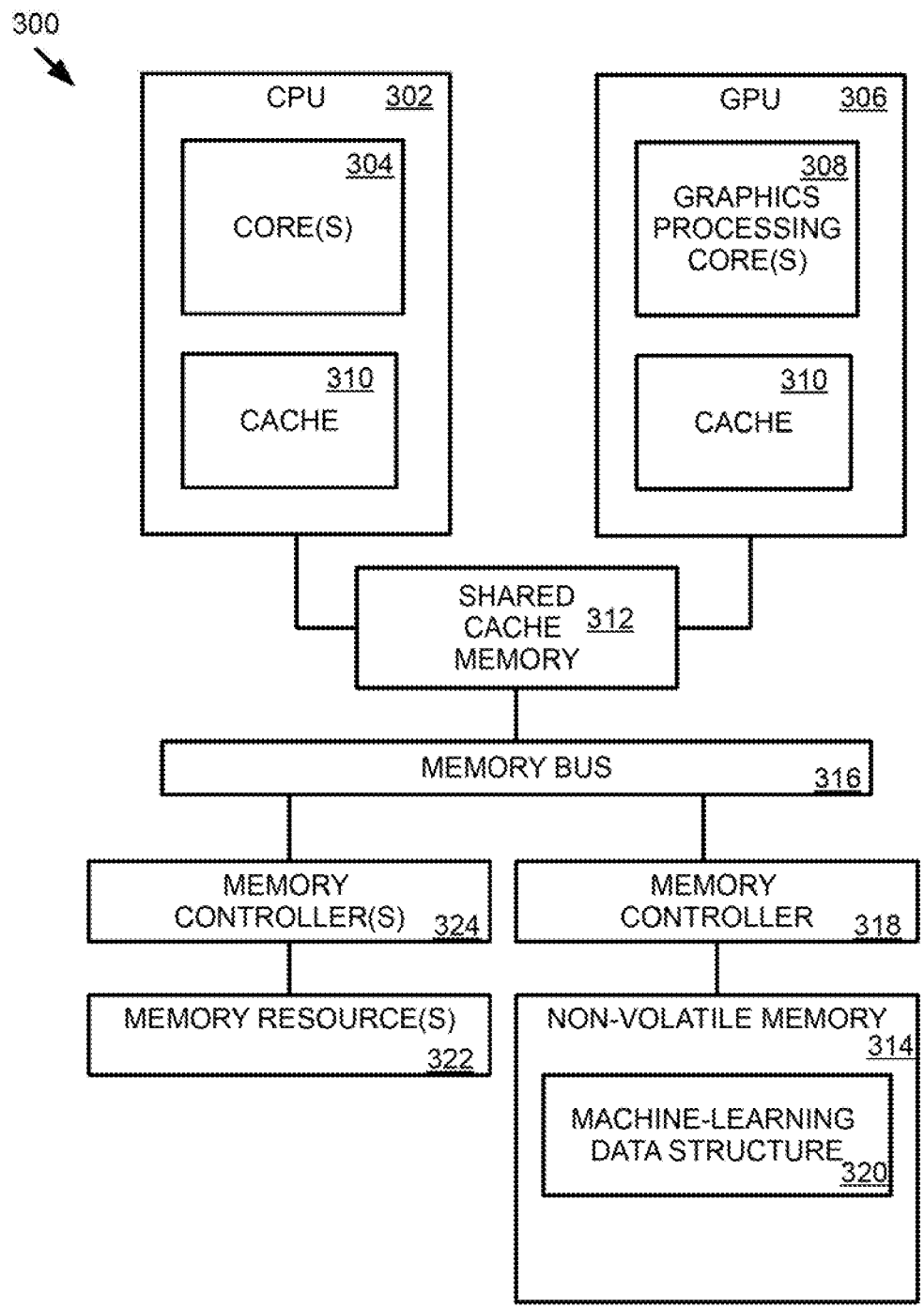
FIG. 3 is a block diagram of some components of an example system.

FIG. 3 provides a block diagram that illustrates some components of an example system 300. As discussed, in some examples, a processing resource comprises a central processing unit (CPU), and in this example, the system 300 comprises a CPU 302 that includes at least one core 304. In some examples, the CPU 302 may comprise one core 304, and in other examples the CPU 302 may comprise two cores 304 (referred to as a dual-core configuration), four cores (referred to as a quad-core configuration), etc. In addition, the system 300 comprises a graphics processing unit (GPU) 306 that includes at least one graphics processing core 308. As will be appreciated, in some examples, the GPU 306 may comprise two graphics processing cores, four graphics processing cores, eight graphics processing cores, sixteen graphics processing cores, etc. While in this example the CPU 302 and GPU 306 are illustrated as separate components, it will be appreciated that in some examples, general purpose processing cores of a CPU and graphics processing cores of a GPU may be integrated in a single component. Accordingly, in these examples, a first processing resource may refer to general purpose processing cores and a second processing resource may refer to graphics processing cores of the single component.

As discussed previously, a graphics processing core may include logic and associated circuitry to execute floating operations. In addition, the graphics processing unit 306 may comprise a plurality of graphics processing cores and associated instruction execution pipelines such that the graphics processing unit 306 may execute a plurality of operations in parallel. Examples of parallel processing architectures include single instruction multiple data (SIMD) processing or a multiple instruction multiple data processing architecture (MIMD). In some examples, the GPU 306 may comprise a plurality of graphics processing cores that may perform vector processing that may be used to concurrently perform a floating point operation on multiple different data sources.

As shown, the CPU 302 and GPU 306 may further comprise cache memory 310. As will be appreciated, the cache memory illustrated in the CPU 302 and GPU 306 may be dedicated memory (i.e., not shared), where such cache memory 310 may comprise an instruction cache, a data cache, and/or a translation look aside buffer. In addition, the CPU 302 and GPU 306 may be directly connected to a shared cache memory 312 such that the CPU 302 and GPU may access the shared cache memory 312 concurrently. As will be appreciated, in some examples, the CPU 302 may fetch instructions and data associated with operations of a machine learning model concurrent with the GPU executing operations of the machine learning model. Accordingly, in some examples, coordinating execution of a machine learning model may comprise fetching instructions and/or data corresponding to the machine learning model with the CPU 302 while the GPU 306 executes operations of the machine learning model.

In addition, the CPU 302 and GPU 306 are connected to a non-volatile memory 314 via a memory bus 316 and a memory controller 318. As will be appreciated, the memory controller 318 may facilitate reading and writing of data for the non-volatile memory 314. While in this example, the memory controller 318 is illustrated as a separate component, it will be appreciated that in some examples, the memory controller 318 may be located on a non-volatile memory module or even integrated into another logical component, such as the CPU 302 and/or GPU 306. As shown, the non-volatile memory may comprise a machine-learning data structure 320 that is a shared memory space for the CPU 302 and the GPU 306. While not shown, the non-volatile memory 314 may have other data structures stored therein, where such other data structures may be shared memory spaces for the CPU 302 and GPU 306 and/or such other data structures may be dedicated memory spaces for the CPU 302 or GPU 306.

Furthermore, in some examples, the CPU 302 and GPU 306 may be connected to additional memory resources 322 (e.g., RAM, hard-drives, etc.) via additional memory controllers 324 and the memory bus 316. As will be appreciated, the additional memory resources 322 may have other shared memory spaces for the CPU 302 and GPU 306 as well as dedicated memory spaces for the CPU 302 or GPU 306.

As will be appreciated, the cores 304 of the CPU 302 and the graphics processing cores 308 of the GPU 306 may perform operations to implement an instruction cycle, which may also be referred to as the fetch-decode-execute cycle. As used herein, processing instructions may refer to performing the fetching, decoding, and execution of instructions. Similarly, executing operations may refer to performing the fetching, decoding, and execution of instructions. For example, a graphics processing core 308 may be described as executing operations of a machine-learning model when the graphics processing core 308 is fetching, decoding, and executing instructions corresponding to the machine-learning model on a dataset.

FIGS. 4-7 provide flowcharts that provide example sequences of operations that may be performed by an example system and/or a processing resource thereof to perform example processes and methods. In some examples, the operations included in the flowcharts may be embodied in a memory resource (such as the example machine-readable storage medium 204 of FIG. 2) in the form of instructions that may be executable by a processing resource to cause the system (e.g., the system 100 of FIGS. 1A-B, the system 200 of FIG. 2, the system 300 of FIG. 3) to perform the operations corresponding to the instructions. Additionally, the examples provided in FIGS. 4-7 may be embodied in systems, machine-readable storage mediums, processes, and/or methods. In some examples, the example processes and/or methods disclosed in the flowcharts of FIGS. 4-7 may be performed by one or more engines implemented in a system.

Figure 4:
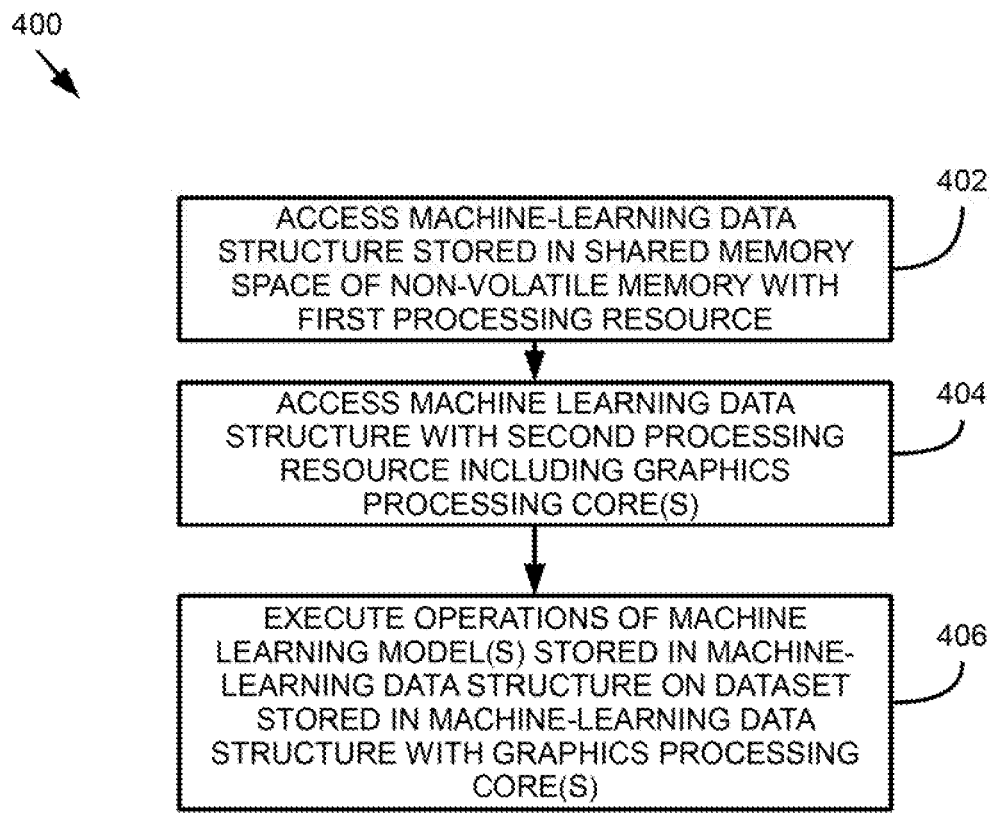
FIG. 4 is a flowchart that illustrates an example sequence of operations that may be performed by an example system.

Turning now to FIG. 4, this figure provides a flowchart 400 that illustrates an example sequence of operations that may be performed by an example system. As shown, the system may access a machine-learning data structure stored in a shared memory space of non-volatile memory with a first processing resource (block 402). In addition, the system may access the machine-learning data structure stored in the shared memory space with a second processing resource that includes at least one graphics processing core (block 404).

The system may execute operations of at least one machine-learning model stored in the machine learning data structure on a dataset stored in the machine-learning data structure with at least one graphics processing core of the second processing resource (block 406).

Therefore, as illustrated by the example of FIG. 4, the shared memory space of the machine-learning data structure may facilitate concurrent access thereof by the first processing resource and the second processing resource. Furthermore, the at least one graphics processing core of the second processing resource may be utilized to execute operations of the machine-learning model which may facilitate improved processing efficiency as compared to execution thereof with general purpose processing cores, such as cores of a CPU. Moreover, storage of the machine-learning models in the non-volatile memory combined with shared access to the machine-learning models may facilitate improved processing efficiency as compared to storage of machine learning models in a storage location and loading of such machine-learning models to a volatile memory for processing.

Figure 5:
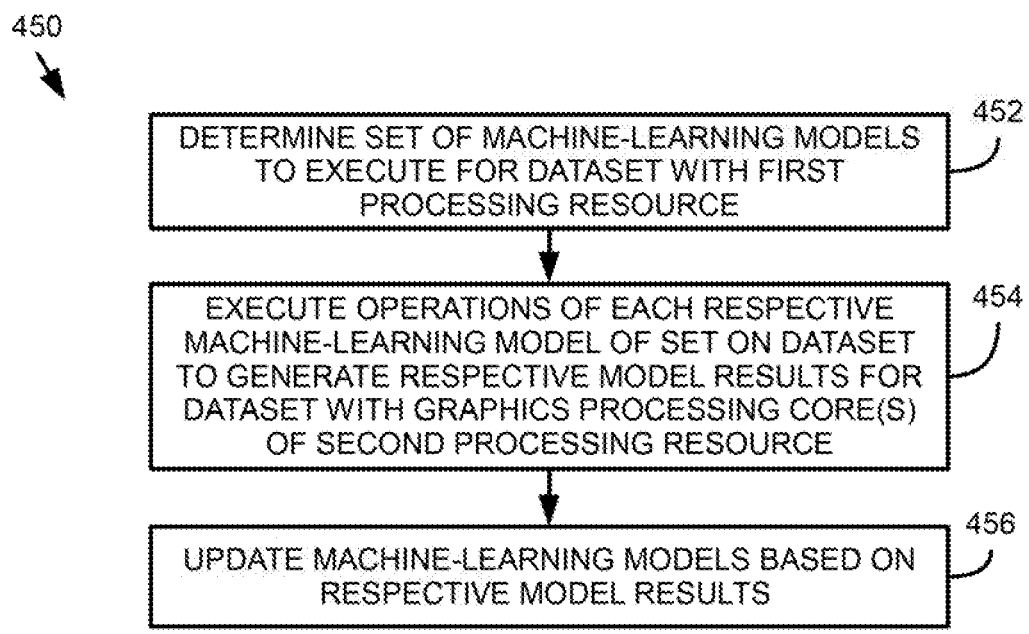
FIG. 5 is a flowchart that illustrates an example sequence of operations that may be performed by an example system.

FIG. 5 provides a flowchart 450 that illustrates an example sequence of operations that may be performed by an example system. In this example, the system may determine a set of machine-learning models to execute for a dataset stored in a machine-learning data structure stored in a non-volatile memory with a first processing resource (block 452). In some examples, a machine-learning data structure of a non-volatile memory may store a plurality of machine-learning models. In these examples, the system may determine a set of at least one machine-learning models to execute for a dataset to be analyzed. For example, the system may determine the set of machine-learning models to execute based at least in part on a type of data of the dataset. For example, if the dataset corresponds to multimedia data (e.g., video data and audio data), the system may select a particular set of machine-learning models. As another example, if the dataset corresponds to sensor data (e.g., measured temperature, measured electromagnetic radiation intensity, etc.), the system may select a particular set of machine-learning models. As will be appreciated, the system may store at least one machine learning model for each type of data that the system may receive for machine-learning analysis.

For the dataset, the system may execute operations of each machine learning model of the set on a dataset stored in the machine-learning data structure with at least one graphics processing core of a second processing resource to generate respective model results for each machine-learning model of the set (block 454). In these examples, it will be appreciated that if the set of machine learning models comprises more than one machine-learning model the graphics processing cores of the second processing resource may switch execution between the machine-learning models of the set. Based on the respective model results for each machine-learning model of the set, the system may update at least one machine-learning model stored in the machine learning data structure (block 456).

Accordingly, in some examples similar to the example provided in FIG. 5, machine-learning models may be updated based on model results generated from analysis of a particular dataset. As will be appreciated, if the particular dataset corresponds to a training dataset, some machine-learning models may be tuned such that parameters of such tuned machine-learning models may be further refined to facilitate improved accuracy and efficiency in execution of the machine-learning model.

Figure 6:
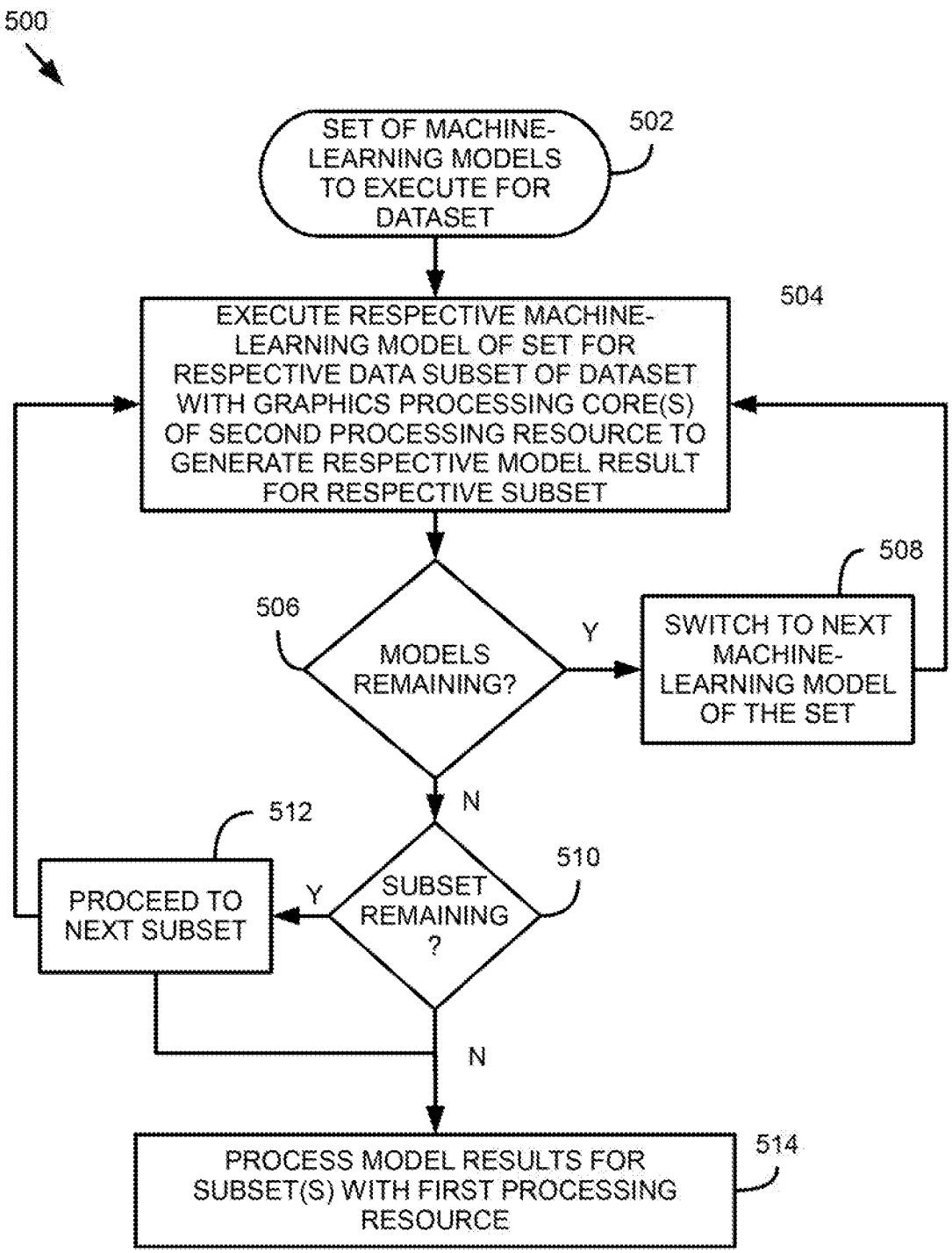
FIG. 6 is a flowchart that illustrates an example sequence of operations that may be performed by an example system.

FIG. 6 provides a flowchart 500 that illustrates a sequence of operations that may be performed by an example system. For a set of machine-learning models to execute for a dataset (block 502), the system may execute a respective machine-learning model of the set for a respective data subset of the dataset with graphics processing cores of a second processing resource to generate model results for the respective data subset (block 504). After execution of the respective machine-learning model for the respective data subset, the system may determine, with a first processing resource, whether any additional machine-learning models remain to be executed (block 506). In response to determining that an additional machine-learning model of the set is to be executed for the respective data subset ("Y" branch of block 506), the system switches to the next machine-learning model of the set to be executed (block 508) and proceeds with execution of the next machine learning model of the set as the respective machine learning model (block 506).

When the system determines, with the first processing resource, that all of the machine-learning models of the set have been executed on the respective data subset ("N" branch of block 506), the system determines, with the first processing resource, whether any data subsets remain for analysis with the set of machine-learning models (block 510). If subsets of data remain for the dataset, the system proceeds to analyzing the next subset of data with the set of machine-learning models (block 512). In some examples, the system may process respective model results generated for each respective subset of data with the first processing resource (block 514).

In these examples, it will be appreciated that the system may comprise a first processing resource, such as a CPU, and a second processing resource that includes graphics processing cores. Accordingly, for a set of machine-learning models to execute, the first processing resource may coordinate execution of the set on a respective data subset. In such examples, the first processing resource may facilitate switching to execution of each machine-learning model of the set with the graphics processing cores of the second processing resource.

For example, a set of machine learning models comprises a first machine learning model, a second machine learning model, and a third machine learning model. In this example, a dataset may comprise a first data subset, a second data subset, and a third data subset. As will be appreciated, the dataset and the set of machine learning models may be stored in a machine-learning data structure stored in a non-volatile memory, where the machine-learning data structure is a shared memory space of a first processing resource and a second processing resource. The second processing resource may comprise a plurality of graphics processing cores. In this example, the first processing resource may coordinate execution of operations of the first machine-learning model with the graphics processing cores of the second processing resource. The graphics processing cores may execute operations of the first machine learning model on the first data subset to generate first model results for the first data subset. The first model results for the first data subset may be stored in the machine-learning data structure by the second processing resource.

Upon completion of execution of the first machine learning model, the first processing resource may coordinate the graphics processing cores to switching of execution the second machine-learning model. The graphics processing cores of the second processing resource may execute operations of the second machine-learning model on the first data subset to generate second model results for the first data subset. The second model results for the first data subset may be stored in the machine-learning data structure by the second processing resource. Upon completion of execution of the second machine learning model, the first processing resource may coordinate switching of execution to the third machine-learning model. The graphics processing cores of the second processing resource may execute operations the third machine-learning model on the first data subset to generate third model results for the first data subset. The third model results for the first data subset may be stored in the machine learning data structure by the second processing resource.

Upon completion of execution of the third machine learning model on the first data subset, the first processing resource may coordinate switching of execution to the first machine learning model for the second data subset. The graphics processing cores of the second processing resource may execute operations of the first machine learning model on the second data subset to generate first model results for the second data subset. The first model results for the second data subset may be stored in the machine-learning data structure. As will be appreciated, the operations described with regard to the example may be performed for the remaining machine-learning models and the third data subset.

The example illustrates that the shared memory space of the machine-learning structure facilitates low-latency in switching between execution of different machine-learning models as compared to systems where switching between machine-learning models may necessitate loading each machine-learning model into a dedicated memory space of graphics processing cores during execution. In addition, because the non-volatile memory may have read/write speeds high enough to facilitate processing of instructions and data directly in the non-volatile memory (such as a storage-class memory), examples may decrease a time associated with switching between machine-learning models for execution as compared to systems that may sequentially load/unload each model into and out of a volatile memory for execution. Furthermore, because the non-volatile memory persists data across a power cycle, the machine-learning models and associated parameters may be stored in the non-volatile memory.

Accordingly, in some examples speed of access to and execution of machine-learning models may be increased as compared to systems in which each model is stored in a storage memory having a read/write speed that does not support direct processing of data and instructions. In such systems, each model is loaded to a memory that may be directly accessed by a CPU, such as RAM, and, after loading to memory accessible by the CPU, the model may be loaded to a dedicated memory that a graphics processing core may access. Therefore, as will be appreciated, the direct and shared accessibility of the machine-learning data structure in a high-speed access non-volatile memory reduces loading and access times associated with executing a machine learning model. In examples where a plurality of machine-learning models may be switched between, the direct and shared accessibility of the machine-learning data structure in a high-speed access non-volatile memory may further reduce time associated with switching between machine-learning models. In turn, power consumption associated with executing machine-learning models may be reduced.

Figure 7:
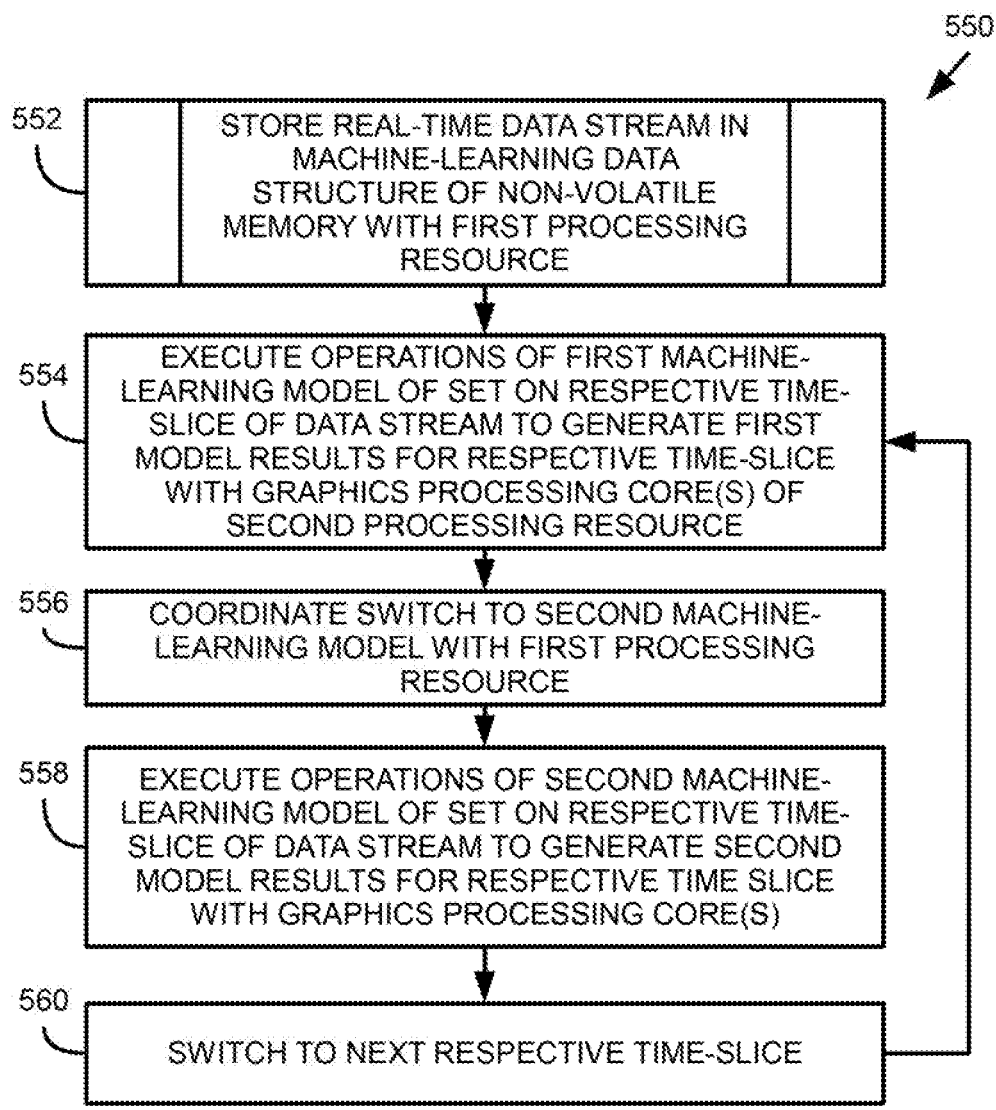
FIG. 7 is a flowchart that illustrates an example sequence of operations that may be performed by an example system.

As will be appreciated, reduced processing time and increased processing efficiency may facilitate processing of real-time data with machine-learning models, where model results from such processing may be further processed concurrently. FIG. 7 provides a flowchart 550 that illustrates a sequence of operations that may be performed by an example system. In this example, the system may store a real-time data stream in a machine-learning data structure of a non-volatile memory of the system (block 552). In this example, the machine learning data structure may be a shared memory space for the first processing resource and a second processing resource, where the second processing resource may comprise at least one graphics processing core. Furthermore, the first processing resource and the second processing resource may directly process instructions and data with the non-volatile memory. For example, the non-volatile memory may be a storage class memory non-volatile memory. In addition, it will be appreciated that the first processing resource continues storing the real-time data stream in the machine-learning data structure concurrent with the system performing additional operations described herein.

In this example, the system executes operations of a first machine learning model of a set of machine-learning models, with graphics processing cores of the second processing resource, on a respective time-slice of the data stream to generate first model results for the respective time slice (block 554). As discussed previously, operations of the machine-learning model may be executed by the graphics processing cores of the second processing resource concurrent with the storing of the real-time data stream with the first processing resource. When execution of the first machine-learning model on the respective time-slice of the data stream is completed, the system may coordinate switching, with the first processing resource, to a second machine-learning model for execution (block 556). The system executes operations of the second machine-learning model of the set, with the graphics processing cores of the second processing resource, on the respective time-slice of the data stream to generate second model results for the respective time-slice of data (block 558).

In this example, the system may continue processing the real-time data with the first and second machine-learning models. Therefore, after executing the operations of the second machine-learning model on the respective time-slice of the data stream, the system switches to the next respective time slice (block 560), and the system repeats the operations described with regard to blocks 554-558 for the next respective time-slice of the data stream.

Accordingly, as illustrated in this example, the first processing resource and the second processing resource may concurrently access the shared memory space of the machine-learning data structure. As illustrated, the first processing resource may write data of a real-time data stream to the machine-learning data structure concurrent with the second processing resource processing the real-time data stream with a set of machine-learning models.

In examples similar to the example illustrated in FIG. 7, it will be appreciated that additional operations may be performed by the system based at least in part on the model results generated for the time-slices of the data stream. For example, the machine-learning models with which the real-time data stream may be processed may correspond to object recognition in a real-time video stream. In such examples, based on the model results, the system may output the real-time video stream based at least in part on the model results. For example, the machine-learning models may correspond to facial recognition and/or analysis of a real-time video stream. In such examples, the system may modify the real-time video stream during output based on model results such that faces may be highlighted during output. In another example, the system may control an input peripheral based on the model results. For example, the system may cause a connected video capture device to move based at least in part on movement of an identified object in the real-time video stream. As another example, the system may be a moveable device, and the moveable device may actuate a motor (to control movement of the device) based at least in part on model results.

Therefore, examples of systems, processes, methods, and/or computer program products implemented as executable instructions stored on a non-transitory machine-readable storage medium described herein may facilitate processing of data with machine-learning models. In examples described herein, a machine learning data structure may be implemented in a non-volatile memory, where the non-volatile memory may have access speeds that support direct processing of instructions and data therein, and the machine-learning data structure may be a shared memory space for a first processing resource (such as a CPU) and a second processing resource having at least one graphics processing core (such as a GPU).

In examples in which the machine-learning models are stored and executed in the shared memory space directly in the non-volatile memory, processing inefficiencies associated with loading and switching execution of the machine-learning models may be reduced. Furthermore, direct execution of machine-learning models in the non-volatile memory with graphics processing cores may improve processing speed associated with executing machine-learning models as compared to execution with general purpose processing cores. Furthermore direct execution of the machine-learning models in the shared memory space may improve processing coherency between different processing resources (e.g., a first processing resource and a second processing resource) such that processing times may be reduced. In addition, in lower-power processing systems, direct processing of data with machine-learning models in a shared memory space of a non-volatile memory may reduce power consumption as compared to systems in which machine-learning models are loaded into a main memory (e.g., volatile RAM) from storage and then loaded to dedicated memory from the main memory.

In addition, while various examples are described herein, elements and/or combinations of elements may be combined and/or removed for various examples contemplated hereby. For example, the example operations provided herein in the flowcharts of FIGS. 4-7 may be performed sequentially, concurrently, or in a different order. Moreover, some example operations of the flowcharts may be added to other flowcharts, and/or some example operations may be removed from flowcharts. Furthermore, in some examples, various components of the example systems of FIGS. 1A-3 may be removed, and/or other components may be added. Similarly, in some examples various instructions of the example memories and/or machine-readable storage mediums of FIG. 2 may be removed, and/or other instructions may be added (such as instructions corresponding to the example operations of FIGS. 4-7).

The preceding description has been presented to illustrate and describe examples of the principles described. This description is not intended to be exhaustive or to limit examples to any precise form disclosed. Many modifications and variations are possible in light of this description.

The invention claimed is:

1. A system comprising:
a non-volatile memory to store a machine-learning data structure including at least two machine-learning models, wherein the non-volatile memory comprises storage class memory, and;
a first processing resource coupled to the non-volatile memory to access the machine-learning data structure;
a second processing resource including at least one graphics processing core, wherein:
the second processing resource is coupled to the non-volatile memory to access the machine-learning data structure such that the machine-learning data structure is a shared memory space of the first processing resource and the second processing resource, and
the at least one graphics processing core of the second processing resource executes operations of the at least two machine-learning models within the shared memory space; and
a processing engine to:
coordinate execution, by the at least one graphics processing core of the second processing resource, of the operations of the at least two machine-learning models within the shared memory space,
store, with the first processing resource, a real-time data stream in the machine-learning data structure, and
determine, with the first processing resource and from a set of machine-learning models, the at least two machine-learning models to execute based at least in part on a type of data associated with the real-time data stream.

2. The system of claim 1, further comprising:
a real-time data input coupled to the first processing resource, wherein the processing engine is further to:
store, with the first processing resource, a real-time data stream received from the real-time data input in the machine-learning data structure of the non-volatile memory, and execute, with the at least one graphics processing core, operations of the at least two machine-learning models on subsets of the real-time data stream to generate model results for the real-time data stream.

3. The system of claim 2, wherein:
the real-time data stream is a real-time video data stream, a subset of the real-time data stream corresponds to a time-slice of the real-time video data stream, and the at least two machine-learning models comprise an object recognition machine-learning model.

4. The system of claim 1, wherein the processing engine is further to:
coordinate, with the first processing resource, execution and switching of the at least two machine-learning models on the second processing resource, with the at least one graphics processing core.

5. The system of claim 1, wherein the at least two machine-learning models comprise a first machine-learning model and a second machine-learning model, and wherein the processing engine is further to:
for each respective subset of the real-time data stream and concurrent with storing the real-time data stream in the machine-learning data structure:
coordinate, with the first processing resource, execution of the first machine-learning model for the respective subset of the real-time data stream,
execute, with the at least one graphics processing core of the second processing resource, operations of the first machine-learning model on the respective subset of the real-time data stream, wherein executing operations of the first machine-learning model on the respective subset of the real-time data stream generates respective first model results for the respective subset of the real-time data stream,
after execution of the first machine-learning model, coordinate switching to execution of the second machine-learning model, and
execute, with the at least one graphics processing core of the second processing resource, operations of the second machine-learning model on the respective subset of the real-time data stream, wherein executing operations of the second machine-learning model on the respective subset of the real-time data stream generates respective second model results for the respective subset of the real-time data stream.

6. The system of claim 5, wherein the processing engine is further to:
for each respective subset of the real-time data stream, process, with the first processing resource, the respective first model results and the respective second model results.

7. The system of claim 1, wherein:
the machine-learning data structure includes a machine-learning data index, the first processing resource is to access the machine-learning data structure based at least in part on the machine-learning data index, and the second processing resource is to access the machine-learning data structure based at least in part on the machine-learning data index.

8. A method comprising:
accessing, with a first processing resource coupled to a non-volatile memory, a machine-learning data structure stored in a shared memory space of the non-volatile memory, wherein the non-volatile memory comprises storage class memory;
accessing, with a second processing resource including at least one graphics processing core coupled to the non-volatile memory, the machine-learning data structure stored in the shared memory space of the non-volatile memory;
coordinating execution, within the shared memory space, of operations of at least two machine-learning models stored in the machine-learning data structure on a dataset stored in the machine-learning data structure, wherein:
execution, within the shared memory space, of the operations of the at least two machine-learning models is coordinated by the first processing resource, and execution, within the shared memory space, of the operations of the at least two machine-learning models is performed by the at least one graphics processing core of the second processing resource,
storing, with the first processing resource, a real-time data stream in the machine-learning data structure; and
determining, with the first processing resource and from a set of machine-learning models, the at least two machine-learning models to execute based at least in part on a type of data associated with the real-time data stream.

9. The method of claim 8, wherein coordinating execution of the operations of the at least two machine-learning models comprises:
causing execution of operations of a first machine-learning model of the at least two machine-learning models on the dataset, wherein execution of the operations of the first machine-learning model on the dataset generates first model results; and
after execution of the operations of the first machine-learning model on the dataset, switching to execution of operations of a second machine-learning model of the at least two machine-learning models on the dataset, wherein execution of the operations of the second machine-learning model on the dataset gene rates second model results.

10. The method of claim 9, further comprising:
updating the first machine-learning model based at least in part on the first model results;
updating the second machine-learning model based at least in part on the second model results; and
after updating the first and second machine-learning models, causing execution of operations of the first machine-learning model that has been updated, on the dataset, wherein execution of the operations of the first machine-learning model that has been updated generates updated first model results, and causing execution of operations of the second machine-learning model that has been updated, on the dataset, wherein execution of the operations of the second machine-learning model that has been updated generates updated second model results.

11. The method of claim 8, wherein:
the dataset is a real-time data stream, accessing the machine-learning data structure with the first processing resource comprises storing the real-time data stream in the machine-learning data structure with the first processing resource, and the operations of the at least two machine-learning models stored on the real-time data stream are executed with the at least one graphics processing core concurrent with storing the real-time data stream in the machine-learning data structure with the first processing resource.

12. The method of claim 9, wherein the machine-learning data structure includes a set of machine-learning models, and the method further comprises:
determining the at least two machine-learning models to execute on the dataset based at least in part on a data type of the dataset.

13. A non-transitory machine readable storage medium comprising instructions executable by a processing resource of a system to cause the system to:
access, with a first processing resource of the system, a machine-learning data structure stored in a shared memory space of a non-volatile memory of the system, wherein the non-volatile memory comprises storage class memory;
determine, with the first processing resource of the system, a set of machine-learning models stored in the machine-learning data structure to execute for a dataset stored in the machine-learning data structure, wherein the set of machine-learning models comprises at least two machine-learning models;
access, with a second processing resource that includes at least one graphics processing core, the machine-learning data structure stored in the shared memory space of the non-volatile memory;
coordinate execution of operations of the set of machine-learning models on the dataset stored in the machine-learning data structure, wherein the execution of the operations is coordinated by the first processing resource, and wherein the execution of the operations of the set of machine-learning models on the dataset is conducted, within the shared memory space, by the at least one graphics processing core of the second processing resource to generate model results for each machine-learning model of the set of machine-learning models;

store, with the first processing resource, a real-time data stream in the machine-learning data structure; and determine, with the first processing resource and from the set of machine-learning models, the at least two machine-learning models to execute based at least in part on a type of data associated with the real-time data stream.

14. The non-transitory machine readable storage medium of claim 13, wherein to coordinate execution of the operations of the set of machine-learning models on the dataset stored in the machine-learning data structure, the non-transitory machine readable storage medium comprises further instructions executable by the processing resource to cause the system to:

for each data subset of the dataset and after executing the operations of a respective machine-learning model of the set, switch to execution of the operations a next respective machine-learning model of the set with the at least one graphics processing core of the second processing resource.

15. The non-transitory machine readable storage medium of claim 13, wherein the dataset is a real-time data stream, and the non-transitory machine readable storage medium comprises further instructions executable by the processing resource to cause the system to:

store the real-time data stream in the machine-learning data structure of the non-volatile memory with the first processing resource, wherein execution of the operations of the set of machine-learning models on the real-time data stream with the at least one graphics processing core of the second processing resource is concurrent with the storage of the real-time data stream in the machine-learning data structure.

\* \* \* \* \*